United States Patent
Higuchi

(10) Patent No.: US 6,949,893 B2
(45) Date of Patent: Sep. 27, 2005

(54) TELEVISION RECEIVER AND COLD-CATHODE TUBE DIMMER

(75) Inventor: Yoshio Higuchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 15 days.

(21) Appl. No.: 10/792,687

(22) Filed: Mar. 3, 2004

(65) Prior Publication Data

US 2004/0217719 A1 Nov. 4, 2004

(30) Foreign Application Priority Data

Mar. 4, 2003 (JP) .................................... 2003-001067 U

(51) Int. Cl.[7] .......................... H05B 37/02; H05B 41/24
(52) U.S. Cl. ....................... 315/312; 315/276; 315/291; 315/352
(58) Field of Search ............................... 315/312, 313, 315/276, 291, 300, 302, 307, 352, 362; H05B 37/02, 41/24

(56) References Cited

U.S. PATENT DOCUMENTS

| | | | | |
|---|---|---|---|---|
| 2001/0035698 A1 | * | 11/2001 | Nakatsuka et al. | 310/318 |
| 2004/0113569 A1 | * | 6/2004 | Henry | 315/307 |
| 2004/0217719 A1 | * | 11/2004 | Higuchi | 315/312 |
| 2005/0088115 A1 | * | 4/2005 | Kimura et al. | 315/291 |

FOREIGN PATENT DOCUMENTS

| | | | | |
|---|---|---|---|---|
| JP | 6-302387 | 10/1994 | | H05B/41/24 |
| JP | 11-122937 | 4/1999 | | H02M/7/48 |
| JP | 3038717 | 3/2000 | | H05B/41/392 |
| JP | 2002-124395 | 4/2002 | | H05B/41/392 |

OTHER PUBLICATIONS

Concise Statement of Relevancy Between The Invention and Materials (1 page).
Patent Abstracts of Japan, Publication No. 11–122937 dated Apr. 30, 1999 (1 page).
Patent Abstracts of Japan, Publication No. 06–302387 dated Oct. 28, 1994 (1 page).
Patent Abstracts of Japan, Publication No. 2002–124395 dated Apr. 26, 2002 (1 page).

* cited by examiner

*Primary Examiner*—Trinh Vo Dinh
(74) *Attorney, Agent, or Firm*—Osha & Liang LLP

(57) ABSTRACT

In a cold-cathode dimmer, a current detector includes a LPF for removing the frequency component of a lighting/driving signal for a lighting driver from the output of a diode for rectifying the voltage across a current detecting resistor and passing the frequency component of an intermittent control signal for controlling the duty ratio of the lighting/driving signal. A luminance controller includes a current value computing section for producing, as a current average value, a multiplied result of a ratio of an interval during which the output level of the LPF is higher than a prescribed level to a period of the output of the LPF and the output level of the LPF during the interval during which it is higher than the prescribed level, and a duty controller for stabilizing a luminance of cold-cathode tubes at a target luminance in such a manner that the duty ratio of the intermittent control signal is set at a value corresponding to a difference between the current average value outputted from the current value computing section and a target value thereof.

7 Claims, 5 Drawing Sheets

TELEVISION RECEIVER AND COLD-CATHODE TUBE DIMMER

BACKGROUND OF THE INVENTION

1. Field of the Invention

This invention relates to a television receiver and a cold-cathode tube dimmer for controlling the brightness of a cold-cathode tube by controlling the ratio of the interval during which the lighting/driving of the cold-cathode tube is done to the interval during which the lighting/driving of the cold-cathode tube is stopped.

2. Description of the Related Art

In the case where the brightness of a cold-cathode tube is controlled in such a manner as to change the voltage of a lighting/driving signal for lighting the cold-cathode tube, when the voltage of the lighting/driving signal is lowered, a phenomenon occurs that the end of the side on which a minus voltage is applied becomes dark. This makes a dimmable range narrow. In order to overcome such an inconvenience, various prior arts have been proposed in which the luminance of the cold-cathode tube is controlled by changing the duty ratio of the lighting/driving signal.

One of these prior arts (first prior art) will be explained below. In this prior art, as shown in FIG. 4, the current flowing through a fluorescent lamp 91 is converted into a voltage using a resistor R91. The voltage across the resistor R91 is rectified and smoothed by a diode D91 and capacitor C91 to provide a signal 92 which represents the average value of the current as a voltage. By controlling the on/off ratio of the power source for an inverter for driving the fluorescent lamp 91 on the basis of the average value of the current represented by the signal 92, the brightness of the fluorescent lamp 91 is controlled to a prescribed brightness. Further, on the basis of the output obtained through division of the power source voltage for the inverter circuit using a potentiometer circuit, the power source voltage is detected. On the detected result of the power source voltage, the on/off ratio of the power source of the inverter circuit is controlled simultaneously (for example, see JP-A-11-122937).

The following prior art (second prior art) has also been proposed. In this prior art, a pulse of which the duty ratio varies according to the resistance of a variable resistor is supplied to the base of the transistor which constitutes the inverter circuit for lighting/driving the fluorescent lamp. Therefore, when the resistance of the variable resistor is varied, the duty ratio when the fluorescent lamp is driven by the inverter circuit varies. Thus, the brightness of the fluorescent lamp tube can be varied by varying the resistance of the variable resistor (see Japanese Patent No. 3038717).

The following prior art (third prior art) has been also proposed. Referring to FIG. 4 (it is assumed that reference numeral 91 designates a cold-cathode tube), this prior art will be explained. The voltage across the resistor R91 connected in series with the cold-cathode tube 91 is rectified by the diode D91, and smoothed by the capacitor C91. Further, a resistor R92 is connected in parallel to the capacitor C91. On the basis of the output 92 thus rectified and smoothed, a PWM signal is created. Using a DC signal obtained from the PWM signal thus created, the voltage of an operating power source to be supplied to the inverter circuit is controlled (for example, see JP-A-6-302387).

The following prior art (fourth prior art) has been further proposed. In this prior art, the voltage across the resistor connected in series with a discharge tube is amplified using an amplifier and the amplified voltage is thereafter added to an adder unit. The voltage generated across the resistor and amplified by the amplifier and a signal for dimming are added in the adder unit. Thus, the brightness of the discharge tube can be controlled to that corresponding to the signal for dimming (for example, see JP-A-2002-124395 (paragraph [0017], FIG. 1)).

However, the first prior art presented the following problem. Specifically, as described in paragraph [0015], the signal 92 is a signal obtained "by extracting the average voltage of a rectified voltage by the diode D91 and capacitor C91". This configuration provides a low-pass filter having a frequency characteristic of removing most of the frequency component of the signal for controlling the on/off duty ratio of the inverter circuit. Therefore, assuming that the current flowing through the fluorescent lamp 91 during driving remains constant, a level difference corresponding to the duty ratio does not occur between the level change (indicated by 92a) when the duty ratio of the lighting/driving signal is increased as indicated by 93a in FIG. 5 and the level change (indicated by 92b) when the duty ratio of the lighting/driving signal is increased (V92a and V92b are equal to each other). On the other hand, if the current flowing through the fluorescent lamp 91 during driving becomes a low level, the level of the signal 92 lowers as indicated by 92c (V92c becomes lower than V92a). Namely, although the signal 92 can accurately represent the variation in the current flowing through the fluorescent lamp, it cannot accurately represent the variation in the duty ratio with a high accuracy. In other words, the signal 92 is a signal with a very low accuracy for the variation in the duty ratio. As a result, in the case where the duty ratio of the lighting/driving signal is controlled in a closed loop using the signal 92, the precision of control is deteriorated, thereby providing a larger variation in the luminance. Thus, in the case where the this prior art is applied to the backlight for a television receiver equipped with a liquid crystal display, the signal is susceptible to the influence of changes in the power source voltage and temperature, thereby providing a variation in the brightness on the screen.

The above problem is brought by the third prior art. However, the third prior art does not adopt the method of controlling the brightness of the cold-cathode tube by changing the duty ratio of the lighting/driving signal. Therefore, the above defect is not problematic. However, since the configuration as a premise is different, it is difficult to apply the third prior art to the case where the brightness of the cold-cathode tube should be stabilized accurately in an apparatus for controlling the brightness by changing the duty ratio of the lighting/driving signal for driving the cold-cathode tube.

Further, although the second prior art controls the brightness of the fluorescent tube by changing the duty ratio of the lighting/driving signal, the method of control is implemented in an opened loop. Therefore, like the third prior art, it is difficult to apply this second prior to the closed loop control in which the current flowing through the cold-cathode tube is detected and the duty ratio of the lighting/driving signal for driving the cold-cathode tube is changed according to the result of detection.

Further, the fourth prior art does not describe in detail how the output from an error voltage detecting circuit is processed in the adder unit. Therefore, it is difficult to apply this fourth prior art to the case where the brightness of the cold-cathode tube should be stabilized accurately in a configuration for controlling the brightness in a configuration in which the current flowing through the cold-cathode tube is detected and the duty ratio of the lighting/driving signal for driving the cold-cathode tube is changed according to the result of detection.

SUMMARY OF THE INVENTION

This invention has been accomplished in order to solve the above problems. An object of this invention is to provide a television receiver which can reduce a variation in the luminance of backlight when the luminance of the backlight of a liquid crystal panel is stabilized to a target luminance by controlling the duty ratio of lighting/driving of a cold-cathode tube, can enhance the control accuracy of the luminance of the backlight, and can prevent the upsizing of a control element for controlling the lighting/driving of the cold-cathode tube as compared with the case where the lighting/driving of the cold-cathode tube and its stopping are carried out by turning on/off the power source path.

Another object of this invention is to provide a cold-cathode tube dimmer which can reduce a variation in the luminance of a cold-cathode tube when the luminance of the cold-cathode tube is stabilized to a target luminance by controlling the duty ratio of lighting/driving of the cold-cathode tube in such a manner that the frequency characteristic of a low-pass filter to which the rectified output of the voltage across a resistor inserted in a current path to the cold-cathode tube is supplied is a characteristic of removing the frequency component of the signal for lighting/driving the cold-cathode tube and passing the frequency component of an intermittent control signal indicative of the duty ratio of the lighting/driving interval of the cold-cathode tube to its stopping interval, and a multiplied value of the ratio of an interval during which the level of an extracted signal is higher than a prescribed level to the period thereof and the level of the extracted signal for the interval during which it is higher than the prescribed level is computed as an average value of the current flowing through the cold-cathode tube so that the duty ratio of lighting/driving the cold-cathode tube is a value corresponding to the current average value thus computed.

Still another object of this invention is to provide a cold-cathode tube dimmer which can further enhance the control accuracy of luminance by enhancing the detection accuracy of the average value of the current flowing through the cold-cathode tube in such a manner that the frequency of an intermittent control signal indicative of the duty ratio of the lighting/driving interval of the cold-cathode tube to its stopping interval is set as a frequency lower than $\frac{1}{10}$ of the frequency of the signal for lighting/driving the cold-cathode tube, and the filter for removing the frequency component of the signal for lighting/driving the cold-cathode tube and passing the frequency component of an intermittent control signal indicative of the duty ratio is designed as a n-type filter.

A further object of this invention is to provide a cold-cathode tube dimmer which can prevent the upsizing of a control element for controlling the lighting/driving of the cold-cathode tube as compared with the case where the lighting/driving of the cold-cathode tube and its stopping are carried out by turning on/off the power source path in such a manner that the lighting/driving of the cold-cathode tube and its stopping are carried out by controlling the base potential of a driving transistor for driving the primary coil of a transformer around which a secondary coil to send out a lighting/driving signal is wound.

In order to solve the above problems, the television receiver according to this invention is applied to a television receiver including: a cold-cathode tube which constitutes a light source for backlight of a liquid crystal panel; a lighting driving means for lighting the cold-cathode tube using a lighting/driving signal at a first frequency; a current detecting means for detecting a current flowing through the cold-cathode tube; and a luminance control means for stabilizing the luminance of the cold-cathode tube at a target luminance in such a manner that the ratio of the interval during which the lighting/driving of the cold-cathode tube is done by the lighting driving means to the interval during which the lighting/driving of the cold-cathode tube is stopped is set at a value corresponding to the result of detection by a duty ratio of an intermittent control signal at a second frequency lower than the first frequency. The second frequency is set at a frequency lower than $\frac{1}{10}$ of the first frequency. The lighting driving means comprises: a driving transistor for driving, by self-oscillation, a primary coil of a transformer around which a secondary coil to send out a lighting/driving signal is wound, and a control transistor for changing the base potential of the driving transistor between a potential where a base current flows through the driving transistor and another potential where the base current ceases to flow. The current detecting means comprises: a current detecting resistor inserted in a current path to the cold-cathode tube, a diode for rectifying a voltage generated across the current detecting resistor, and a p-type filter which is a low-pass filter for removing a first frequency component from the output of the diode and passing a second frequency component. The luminance control means comprises: a current value computing means for producing, as a current average value, a multiplied result of a ratio of an interval during which the output level of the Π-type filter is higher than a prescribed level to a period with which the output level of the Π-type filter changes and the output level of the p-type filter during the interval during which the output level of the π-type filter is higher than the prescribed level, and a duty control means for stabilizing the luminance of the cold-cathode tube at the target luminance in such a manner that the duty ratio of the intermittent control signal is set at a value corresponding to a difference between the current average value outputted from the current value computing means and a target value thereof.

Specifically, the low pass filter serves to remove the first frequency component and pass the second frequency component. The signal having passed the low pass filter, therefore, accurately represents a change in the duty ratio. Thus, the current average value accurately represents the average value of the power supplied to the cold-cathode tube. For this reason, if the duty ratio of the intermittent control signal is set at a value corresponding to the difference between the current average value and target value, the luminance of the backlight can be controlled to a target luminance. Further, even when the rate of removing the signal component at the first frequency is increased, the signal component at the second frequency can be passed without being attenuated. Thus, the signal having passed the low pass filter is a signal which can accurately represent a change in the duty ratio. The control transistor may be able to control the base current. Namely, the control transistor may be an element which can control a small current.

The cold-cathode tube dimmer according to this invention is applied to a cold-cathode tube dimmer comprising: a lighting driving means for lighting a cold-cathode tube using a lighting driving signal at a first frequency; a current detecting means for detecting a current flowing through the cold-cathode tube; and a luminance control means for stabilizing the luminance of the cold-cathode tube at a target luminance in such a manner that the ratio of the interval during which the lighting/driving of the cold-cathode tube is done by the lighting driving means to the interval during which the lighting/driving of the cold-cathode tube is stopped is set at a value corresponding to the result of detection by a duty ratio of an intermittent control signal at a second frequency lower than the first frequency. The current detecting means comprises: a current detecting resistor inserted in a current path to the cold-cathode tube, a diode for rectifying a voltage generated across the current detecting resistor, and a low-pass filter for removing a first frequency component from the output from the diode and passing a second frequency component. The luminance control means comprises: a current value computing means for producing, as a current average value, a multiplied result of a ratio of an interval during which the output level of the low-pass filter is higher than a prescribed level to a period during which the output level of the low-pass filter changes and the output level of the low-pass filter during the interval during which the output level of the low-pass filter is higher than the prescribed level, and a duty control means for stabilizing the luminance of the cold-cathode tube at the target luminance in such a manner that the duty ratio of the intermittent control signal is set at a value corresponding to a difference between the current average value outputted from the current value computing means and a target value thereof.

Specifically, the low pass filter serves to remove the first frequency component and pass the second frequency component. The signal having passed the low pass filter, therefore, accurately represents a change in the duty ratio. Thus, the current average value accurately represents the average value of the power supplied to the cold-cathode tube. For this reason, if the duty ratio of the intermittent control signal is set at a value corresponding to the difference between the current average value and target value, the luminance of the cold-cathode tube can be accurately controlled to a target luminance.

In addition to the above configurations, the second frequency is set at a frequency lower than $\frac{1}{10}$ of the first frequency, and the low-pass filter is designed as a p type filter. For this reason, even when the rate of removing the signal component at the first frequency is increased, the signal component at the second frequency can be passed without being attenuated. Thus, the signal having passed the low pass filter is a signal which can accurately represent a change in the duty ratio.

Further, in addition to the above configurations, the lighting driving means includes a driving transistor for driving, by self-oscillation, a primary coil of a transformer around which a secondary coil to send out a lighting/driving signal is wound, and a control transistor for changing the base potential of the driving transistor between a potential where a base current flows through the driving transistor and another potential where the base current ceases to flow. The control transistor may be able to control the base current. Namely, the control transistor may be an element which can control a small current.

DETAILED DESCRIPTION OF THE PREFFERED EMBODIMENTS

Figure 1:
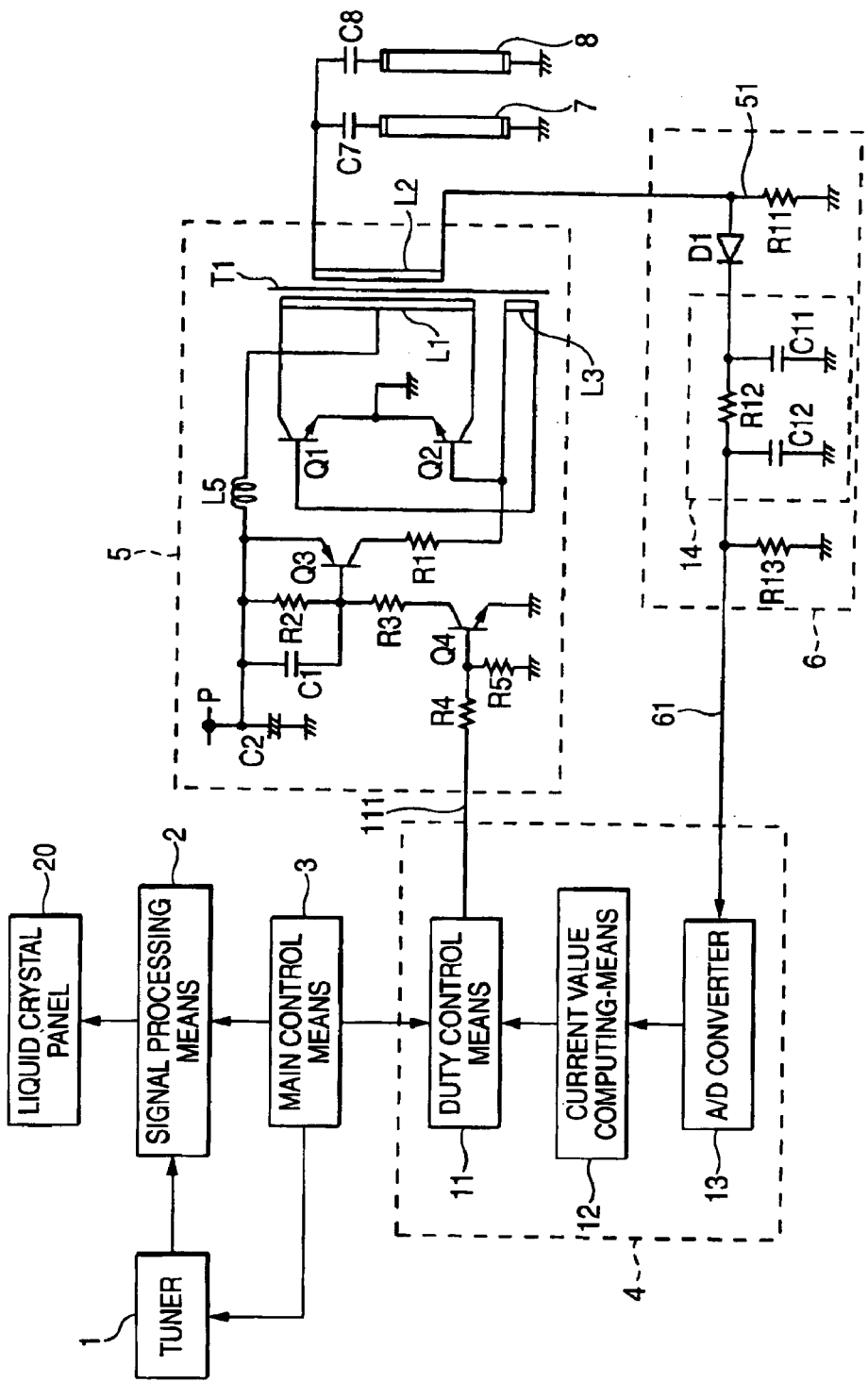
FIG. 1 is a view for explaining the electric configuration of a television receiver to which an embodiment of a cold-cathode tube dimmer according to an embodiment of this invention is applied.

Now referring to the drawings, an explanation will be given of various embodiments of this invention.

Figure 2:
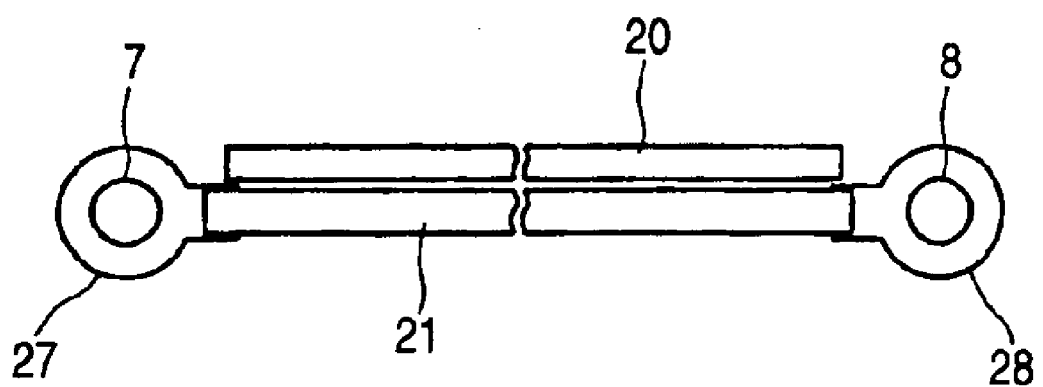
FIG. 2 is a sectional view of the structure of a backlight equipped with a cold-cathode tube.

FIG. 2 is a sectional view of the structure of a backlight equipped with cold-cathode tubes of which the luminance is controlled by the cold-cathode tube dimmer according to an embodiment of this invention.

In FIG. 2, a light conducting plate 21 is made of white synthetic resin and has a rectangular flat shape in a flat view. The light conducting plate 21 is provided with slender cylindrical cold-cathode tubes 7 and 8 at both ends, respectively. The light conducting plate 21 is provided with reflecting plates 27 and 28 around the cold-cathode tubes 7 and 8, respectively. The reflecting plates 27 and 28 serve to reflect the light from the cold-cathode tubes 7 and 8 toward the conducting plate 21, respectively. On the front side (upper side in the drawing) of the light conducting plate 21, a liquid crystal panel is arranged which passes the light from the light conducting plate 21 to display an image.

FIG. 1 is a view for explaining the electric configuration of a television receiver to which an embodiment of the cold-cathode tube dimmer according to an embodiment of this invention is applied. This embodiment mainly includes a liquid crystal panel 20, a tuner 1, a signal processing means 2, a main control means 3, a luminance control means 4, a lighting driving means 5, a current detecting means 6, capacitors C7, C8 and cold-cathode tubes 7, 8.

The tuner 1 serves to receive a commercial broadcasting at a channel designated by the main control means 3. The tuner 1 supplies a video signal obtained through the reception to the signal processing means 2. The signal processing means 2 performs predetermined processing for the video signal supplied from the tuner 1, or the video signal externally supplied (not shown). By driving the liquid crystal panel 20 using the signal obtained through the predetermined processing, an image is displayed on the liquid crystal panel 20.

The lighting driving means 5 serves to light/drive the cold-cathode tubes 7 and 8 using a lighting/driving signal at the frequency (self-oscillation frequency) at a first frequency (about 53 KHz in this embodiment). For this purpose, the lighting driving means 5 includes a transformer T1 on which a primary coil L1, a secondary coil L2 and a feedback coil L3 are wound. The light/driving means 5 also includes two driving transistors Q1 and Q2 with collectors connected to terminals at the ends of the primary coil L1 and emitters connected to ground. The respective bases of the driving transistors Q1 and Q2 are connected to the feedback coil L3. The midpoint of the primary coil L1 is supplied with plus power P of 12 V through an inductance L5.

The emitter of the control transistor Q3 is connected to a plus power source P. The collector of the control transistor Q3 is connected to the base of the driving transistor Q2 through a resistor R1 for setting the base currents of the driving transistors Q1 and Q2 at a prescribed value. The base of the control transistor Q3 is connected to the plus power source P through a resistor R2 for boosting the base potential to the emitter potential. The base of the control transistor Q3 is connected to the collector of a transistor Q4 through a resistor R3 for setting the base current. The base of the transistor Q4 is connected to ground. The base of the transistor Q4 is supplied with an intermittent control signal 111 which is sent out from the duty control means 11 through a resistor R4 for setting the base current.

A capacitor C2 connected between the plus power source P and ground level serves to reduce the impedance of the plus power source P when viewed from the load. A capacitor C1 connected in parallel to a resistor R2 serves to smooth a change in the base potential of the control transistor Q3. A resistor R5 connected between the base of the transistor Q4 and the ground level serves to limit an increase in the base impedance of the transistor Q4. Further, the one terminal of the secondary coil L2 is connected to the one terminal of the cold-cathode tube 7 through a capacitor C7 and also connected to the one terminal of the cold-cathode tube 8 through a capacitor C8. The other terminals of the cold-cathode tubes 7 and 8 are connected to ground. The capacitors C7 and C8 serve to suppress variations in the current flowing through the cold-cathode tubes 7 and 8.

The lighting driving means 5 has the configuration described above. For this reason, when the output (intermittent control signal) 111 from the duty control means 11 becomes an H level, the transistor Q4 turns on so that the base current flows through the control transistor Q3. As a result, the control transistor Q3 turns on so that its collector potential becomes a potential which causes the base currents to flow through the driving transistors Q1 and Q2. Thus, the driving transistors Q1 and Q2 performs self-oscillation at the first frequency so that a high voltage is produced from the secondary coil L2, thereby lighting/driving the cold-cathode tubes 7 and 8. On the other hand, when the intermittent control signal 111 becomes an L level, the transistor Q4 turns off. As a result, the control transistor Q3 turns off so that its collector potential becomes a potential which does not cause the base currents to flow through the driving transistors Q1 and Q2. Thus, the driving transistors Q1 and Q2 stop the self-oscillation so that the high voltage is not produced from the secondary coil L2, thereby stopping the lighting/driving of the cold-cathode tubes 7 and 8.

Namely, by controlling the ratio of the H level to the low level in the intermittent control signal 111 outputted from the duty control means 11, i.e. the duty ratio of the intermittent control signal 111, the luminance of each of the cold-cathode tubes 7 and 8 can be controlled. Incidentally, the frequency (second frequency) of the intermittent control signal 111 is set at about 200 Hz that is about 1/26 of the first frequency (the first frequency and the second frequency may be set at any other frequency in a range where the second frequency is lower than 1/10 of the first frequency).

The current detecting means 6 serves to detect the currents flowing through the cold-cathode tubes 7 and 8. To this end, the current detecting means 6 includes a resistor R11 connected between the other terminal of the secondary coil L2 and the ground level (resistor inserted in the current path to the cold-cathode tubes 7 and 8). The current detecting means 6 includes a diode D1 for rectifying the voltage generated across the resistor R11 and also a low-pass filter 14 for removing the first frequency component of the output from the diode D1 and passing the second frequency component thereof.

Incidentally, the low-pass filter 14 passes the second frequency component (about 200 Hz) without being attenuated even when the first frequency component (about 53 KHz) is removed at a high rate. To this end, the low-pass filter 14, which is composed of a resistor R12 and capacitors C11, C12, is designed as a π-type filter which provides a good frequency characteristic of attenuation. A resistor R13 connected between the output from the low-pass filter 14 and the ground level facilitates the discharge from the capacitor C12 in the low-pass filter 14.

The luminance control means 4 serves to control the ratio of the interval during which the lighting/driving of the cold-cathode tubes 7 and 8 is done by the lighting driving means 5 to the interval during which the lighting/driving of the cold-cathode tubes 7 and 8 is stopped, by the duty ratio of the intermittent control signal 111 at the second frequency on the basis of the detection result by the current detecting means 6. To this end, the luminance control means 4 includes an A/D converter 13, a current value computing means 12 and a duty control means 11.

The A/D converter 13 digitizes an output from the low-pass filter 14 and supplies the output thus digitized to the current value computing means 12. The current value computing means 12 acquires, as a current average value, a multiplied result of a ratio of a period (equal to the period of the second frequency) with which the output level of the low-pass filter changes to an interval during which the output level of the low-pass filter is higher than a prescribed level (e.g. about 2 V) and the output level of the low-pass filter 14 for the interval during which the output level of the low-pass filter is higher than the prescribed level. Further, the duty control means 11 acquires a difference between the current average value outputted from the current value computing means 12 and a target value (which designates the brightness of the image displayed by the liquid crystal panel 20) given by the main control means 3. The duty control means 11 sets the duty ratio at that corresponding to the difference thus acquired to control the luminance of each of the cold-cathode tubes 7 and 8 to the target luminance.

The main control means 3 serves to control the main operation of the television receiver. To this end, the main control means 3 controls the channel received by the tuner 1. The main control means 3 also controls the operation of the signal processing means 2 to control the image quality, contrast and hue of the image. The main control means 3 gives the target value of the luminance when the cold-cathode tubes 7 and 8 are lit to the duty control means 11. Incidentally, the main control means 3, duty control means 11, current value computing means 12 and A/D converter 13 are blocks configured by a microcomputer.

Figure 3:
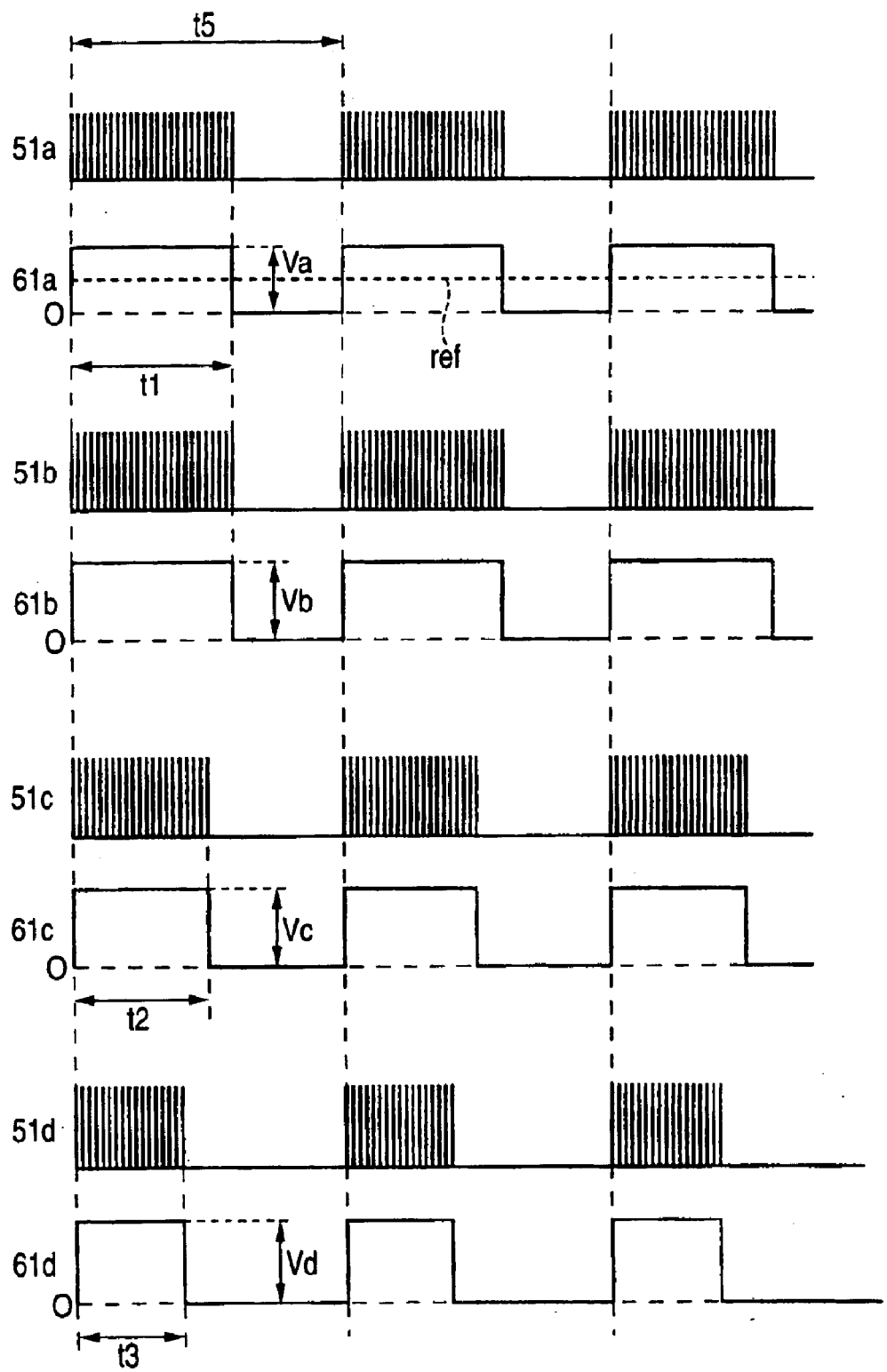
FIG. 3 is a graph for explaining the waveforms of a main signal in a current detecting means.
Figure 4:
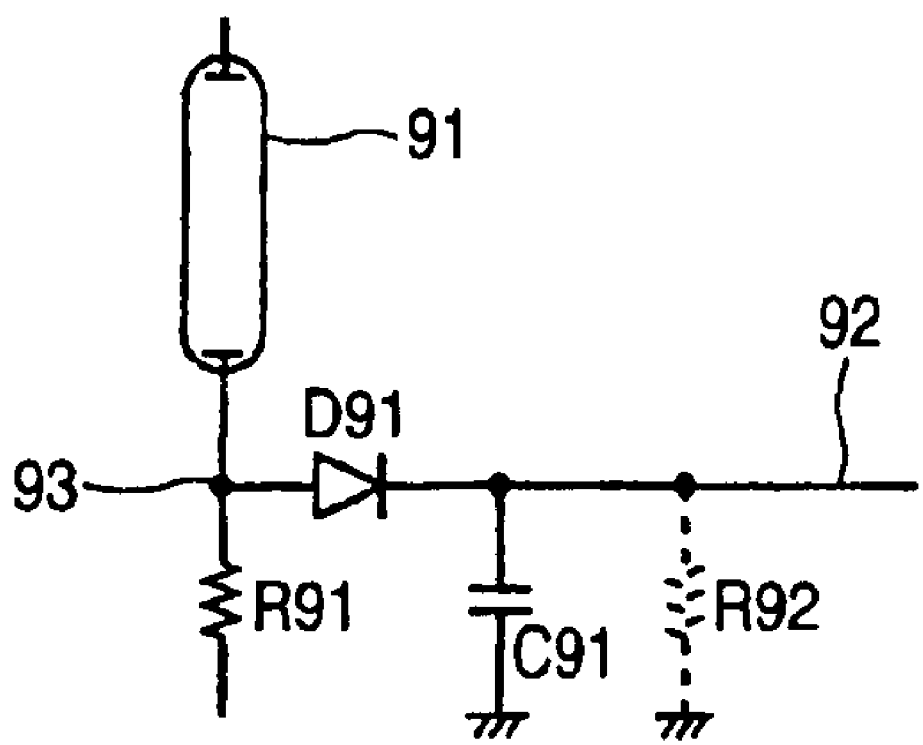
FIG. 4 is a circuit diagram showing an electrical connection of a prior art.
Figure 5:
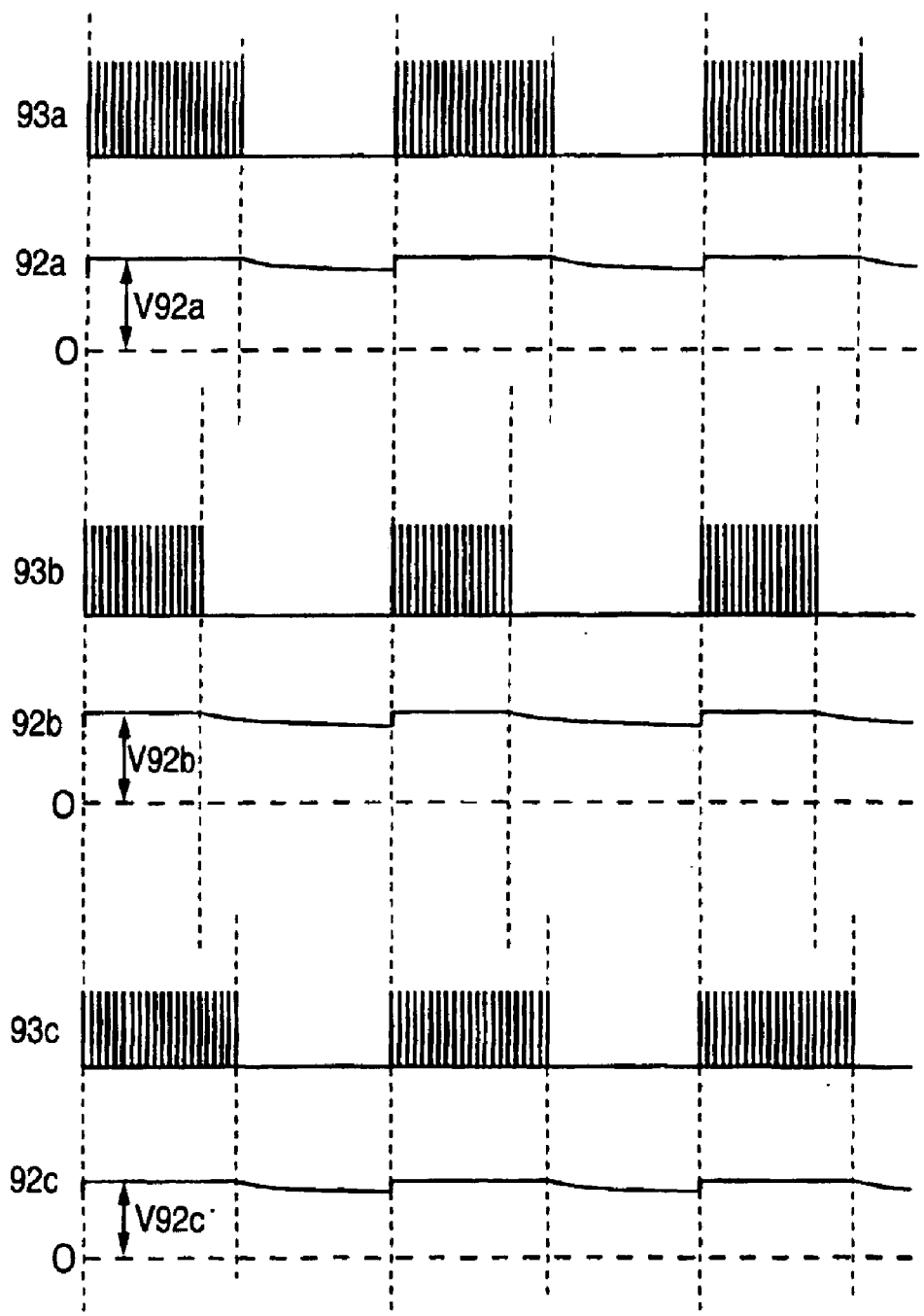
FIG. 5 is a graph showing the signal waveforms in current detection in another prior art.

FIG. 3 is a graph for explaining changes in the main signal in an embodiment. Referring to FIG. 3 as well, the operation of the embodiment will be described.

When the power source is in an off state, the duty control means 11 places the level of the intermittent control signal 111 in an L level so that the self-oscillation by the driving transistors Q1 and Q2 is stopped, thereby maintaining the cold-cathode tubes 7 and 8 in the non-lighting state. In this state, when the power source turns on so that an instruction of lighting the cold-cathode tubes 7 and 8 is given by the main control means 3, the duty control means 11 sends out the intermittent control signal 111 having a duty ratio equal to the duty ratio at the time of the previous turn-on of the power source. Thus, the lighting driving means 5 repeats the lighting/driving of the cold-cathode tubes 7 and 8 and its stopping at the duty ratio corresponding to that of the intermittent control signal. The waveform of the voltage across the current detecting resistor R11 at this time is such as represented by 51a.

As described above, the low-pass filter 14 has the characteristic of removing the first frequency component and passing the second frequency component. The low-pass filter 14 is a Π-type filter so that it can suppress the rate of attenuating the second frequency component to a small value even when the rate of removing the first frequency component is increased. Thus, the signal sent out from the current detecting means 6 is a signal which accurately illustrates the envelope of the signal 51a as represented by 61a.

The current value computing means 12, to which the signal 61a from the current detecting means 6 is supplied, acquires the ratio P (P=t1/t5) of the period t5 of the signal 61a to the interval t1 during which the level of the signal 61a is higher than a prescribed level ref. Now it is assumed that the ratio P is 60%. The current value computing means 12 detects the level Va of the signal 61a during the interval t1, and computes the current average value which is expressed by (Va×P).

The duty control means 11 compares the current average value supplied by the current value computing means and the target value of the luminance supplied by the main control means 3. Now if the target value of the luminance supplied by the main control means 3 is equal to the current average value supplied by the current value computing means 12, assuming that the cold-cathode tubes 7 and 8 have the designated luminance, the duty control means 1 continues to produce the intermittent control signal 111 with this duty ratio.

Now it is assumed that while the above state continues the current flowing through the cold-cathode tubes 7 and 8 has increased as a result of an increase in the voltage of the plus power source P and a rise in the level of the lighting/driving signal driving the cold-cathode tubes 7 and 8 (the voltage across the current detecting resistor R11 is represented by 51b). The signal produced from the current detecting means 6 therefore rises to Vb in the level during the interval t1 as represented by 61b (Vb>Va). As a result, the current average value computed by the current value computing means 12 becomes Vb/Va times as large as the previous value. Thus, the duty control means 11 produces the intermittent control signal 111 with the duty ratio that is (Va/Vb) times as large as the previous duty ratio.

In FIG. 3, reference numeral 51c denotes the waveform of the voltage across the current detecting resistor R11. Reference numeral 61c denotes the waveform of the signal 61 produced from the current detecting means 6. Specifically, the duty ratio of the intermitted control signal 111 is controlled so that the value obtained by multiplying the ratio (t2/t5) of the interval t2 during which a current flows through the cold-cathode tubes 7 and 8 to the period t5 by the level Vc of the signal 61c during the interval t2 is equal to the value obtained by multiplying the ratio (t1/t5) of the interval t1 to the period t5 by the level Va of the signal 61a during the interval t1.

It is now assumed that while the above state continues, since an instruction of lowering the luminance of the image has been issued from a user, the target value given to the duty control means 11 by the main control means 3 has been changed to the value of 80% of the previous value. At this time, the current average value outputted from the current value computing means 12 becomes (100/80) times of the target value given by the main control means 3. The duty control means 11 therefore changes the duty ratio of the intermittent control signal 111 to 0.8 times of the previous duty ratio. Reference numeral 51d represents the waveform of the voltage across the current detecting resistor R11. Interval t3 is 80% of interval t2 (the level Vd during the interval t3 is equal to the level Vc during the interval t2). As a result, the average value of the power supplied to the cold-cathode tubes 7 and 8 becomes 80% of the previous value, and hence the luminance of the cold-cathode tubes 7 and 8 becomes 80% of the previous value.

As understood from the description hitherto made, in accordance with this invention, the low pass filter serves to remove the first frequency component and pass the second frequency component. The signal having passed the low pass filter, therefore, accurately represents a change in the duty ratio. Thus, the current average value accurately represents the average value of the power supplied to the cold-cathode tubes. For this reason, if the duty ratio of the intermittent control signal is set at a value corresponding to the difference between the current average value and target value, the luminance of the backlight can be controlled to a target luminance. Further, the second frequency is set as a frequency lower than 1/10 of the first frequency. The low pass filter is designed as a Π-type filter. For this reason, even when the rate of removing the signal component at the first frequency is increased, the signal component at the second frequency can be passed without being attenuated. Thus, the signal having passed the low pass filter is a signal which can accurately represent a change in the duty ratio. The control transistor may be able to control the base current. Namely, the control transistor may be an element which can control a small current. Accordingly, this invention can reduce a variation in the luminance of backlight when the luminance of the backlight of a liquid crystal panel is stabilized to a target luminance by controlling the duty ratio of lighting/driving of cold-cathode tubes, can enhance the control accuracy of the luminance of the backlight, and can prevent the upsizing of a control element for controlling the lighting/driving of the cold-cathode tubes s as compared with the case where the lighting/driving of the cold-cathode tubes and its stopping are carried out by turning on/off the power source path.

Further, in accordance with this invention, the low pass filter serves to remove the first frequency component and pass the second frequency component. The signal having passed the low pass filter, therefore, accurately represents a change in the duty ratio. Thus, the current average value accurately represents the average value of the power supplied to the cold-cathode tubes. For this reason, if the duty ratio of the intermittent control signal is set at a value corresponding to the difference between the current average value and target value, the luminance of the cold-cathode tubes can be controlled to a target luminance. Accordingly, this invention can reduce a variation in the luminance of the cold-cathode tubes when the luminance of the cold-cathode tube is stabilized to a target luminance by controlling the duty ratio of lighting/driving of the cold-cathode tubes.

Further, the second frequency is set at a frequency lower than 1/10 of the first frequency. The low pass filter is designed as a p filter. For this reason, even when the rate of removing the signal component at the first frequency is increased, the signal component at the second frequency can be passed without being attenuated. Thus, the signal having passed the low pass filter is a signal which can accurately represent a change in the duty ratio. As a result, the accuracy of controlling the luminance can be further enhanced.

Further, the lighting driving means includes a driving transistor for driving, by self-oscillation, a primary coil of a transformer around which a secondary coil to send out a lighting/driving signal is wound, and a control transistor for changing the base potential of the driving transistor between a potential where a base current flows through the driving transistor and another potential where the base current ceases to flow. The control transistor, therefore, may be an element which can control the base current. Accordingly, this invention can prevent the upsizing of a control element for controlling the lighting/driving of the cold-cathode tubes as compared with the case where the lighting/driving of the cold-cathode tubes and its stopping are carried out by turning on/off the power source path.

What is claimed is:

1. A television receiver comprising:
    a cold-cathode tube which constitutes a light source for backlight of a liquid crystal panel;
    a lighting driving means for lighting the cold-cathode tube using a lighting/driving signal at a first frequency;
    a current detecting means for detecting a current flowing through the cold-cathode tube; and
    a luminance control means for stabilizing the luminance of the cold-cathode tube at a target luminance in such a manner that the ratio of the interval during which the lighting/driving of the cold-cathode tube is done by the lighting driving means to the interval during which the lighting/driving of the cold-cathode tube is stopped is set at a value corresponding to the result of detection by a duty ratio of an intermittent control signal at a second frequency lower than the first frequency;
    wherein the second frequency is set at a frequency lower than $1/10$ of the first frequency;
    the lighting driving means comprises:
    a driving transistor for driving, by self-oscillation, a primary coil of a transformer around which a secondary coil to send out a lighting/driving signal is wound, and
    a control transistor for changing the base potential of the driving transistor between a potential where a base current flows through the driving transistor and another potential where the base current ceases to flow;
    the current detecting means comprises:
    a current detecting resistor inserted in a current path to the cold-cathode tube,
    a diode for rectifying a voltage generated across the current detecting resistor, and
    a π-type filter which is a low-pass filter for removing a first frequency component from the output of the diode and passing a second frequency component; and
    the luminance control means comprises:
    a current value computing means for producing, as a current average value, a multiplied result of a ratio of an interval during which the output level of the π-type filter is higher than a prescribed level to a period with which the output level of the π-type filter changes and the output level of the π-type filter during the interval during which the output level of the π-type filter is higher than the prescribed level, and
    a duty control means for stabilizing the luminance of the cold-cathode tube at the target luminance in such a manner that the duty ratio of the intermittent control signal is set at a value corresponding to a difference between the current average value outputted from the current value computing means and a target value thereof.

2. A cold-cathode tube dimmer comprising:
    a lighting driving means for lighting a cold-cathode tube using a lighting/driving signal at a first frequency;
    a current detecting means for detecting a current flowing through the cold-cathode tube; and
    a luminance control means for stabilizing the luminance of the cold-cathode tube at a target luminance in such a manner that the ratio of the interval during which the lighting/driving of the cold-cathode tube is done by the lighting driving means to the interval during which the lighting/driving of the cold-cathode tube is stopped is set at a value corresponding to the result of detection by a duty ratio of an intermittent control signal at a second frequency lower than the first frequency;
    wherein the current detecting means comprises:
    a current detecting resistor inserted in a current path to the cold-cathode tube,
    a diode for rectifying a voltage generated across the current detecting resistor, and
    a low-pass filter for removing a first frequency component from the output from the diode and passing a second frequency component; and
    the luminance control means comprises:
    a current value computing means for producing, as a current average value, a multiplied result of a ratio of an interval during which the output level of the low-pass filter is higher than a prescribed level to a period with which the output level of the low-pass filter changes and the output level of the low-pass filter during the interval during which the output level of the low-pass filter is higher than the prescribed level, and
    a duty control means for stabilizing the luminance of the cold-cathode tube at the target luminance in such a manner that the duty ratio of the intermittent control signal is set at a value corresponding to a difference between the current average value outputted from the current value computing means and a target value thereof.

3. The cold-cathode tube dimmer according to claim 2, wherein the second frequency is set at a frequency lower than $1/10$ of the first frequency, and the low-pass filter is designed as a π-type filter.

4. The cold-cathode dimmer according to claim 3, wherein the lighting driving means comprises:
    a driving transistor for driving, by self-excitation, a primary coil of a transformer around which a secondary coil to send out a lighting/driving signal is wound, and
    a control transistor for changing the base potential of the driving transistor between a potential where a base current flows through the driving transistor and another potential where the base current ceases to flow.

5. A cold-cathode tube dimmer comprising:
    a lighting driver that lights a cold-cathode tube using a lighting driving signal at a first frequency;
    a current detector that detects a current flowing through the cold-cathode tube; and
    a luminance controller that stabilizes the luminance of the cold-cathode tube at a target luminance in such a manner that the ratio of the interval during which the lighting/driving of the cold-cathode tube is done by the lighting driver to the interval during which the lighting/driving of the cold-cathode tube is stopped is set at a value corresponding to the result of detection by a duty ratio of an intermittent control signal at a second frequency lower than the first frequency;
    wherein the current detector comprises:
    a current detecting resistor inserted in a current path to the cold-cathode tube, a diode for rectifying a voltage generated across the current detecting resistor, and a low-pass filter for removing a first frequency component from the output from the diode and passing a second frequency component; and the luminance controller comprises:

a current value computing section that produces, as a current average value, a multiplied result of a ratio of an interval during which the output level of the low-pass filter is higher than a prescribed level to a period with which the output level of the low-pass filter changes and the output level of the low-pass filter during the interval during which the output level of the low-pass filter is higher than the prescribed level, and a duty control section that stabilizes the luminance of the cold-cathode tube at the target luminance in such a manner that the duty ratio of the intermittent control signal is set at a value corresponding to a difference between the current average value outputted from the current value computing section and a target value thereof.

6. The cold-cathode tube dimmer according to claim 5, wherein the second frequency is set at a frequency lower than 1/10 of the first frequency, and the low-pass filter is designed as a π-type filter.

7. The cold-cathode dimmer according to claim 6, wherein the lighting driver comprises:

a driving transistor for driving, by self-excitation, a primary coil of a transformer around which a secondary coil to send out a lighting/driving signal is wound, and a control transistor for changing the base potential of the driving transistor between a potential where a base current flows through the driving transistor and another potential where the base current ceases to flow.

* * * * *